No. 836,022. PATENTED NOV. 13, 1906.
R. W. ERWIN.
CONTINUOUS STILL AND CONDENSER.
APPLICATION FILED JUNE 24, 1905.

2 SHEETS—SHEET 2.

ATTEST:—
M. P. Smith
F. M. Harrington

INVENTOR:—
Robert W. Erwin
By Higdon & Longan
ATTY's.

UNITED STATES PATENT OFFICE.

ROBERT W. ERWIN, OF ST. LOUIS, MISSOURI.

CONTINUOUS STILL AND CONDENSER.

No. 836,022.  Specification of Letters Patent.  Patented Nov. 13, 1906.

Application filed June 24, 1905. Serial No. 266,893.

*To all whom it may concern:*

Be it known that I, ROBERT W. ERWIN, a citizen of the United States, and a resident of St. Louis, Missouri, have invented certain new and useful Improvements in Continuous Stills and Condensers, of which the following is a specification containing a full, clear, and exact description, reference being had to the accompanying drawings, forming a part hereof.

My invention relates to a continuous still and condenser, particularly adapted for the continuous distillation, separation, and condensation of wood-alcohol.

My improved apparatus is used for obtaining a high-grade or nearly pure wood-alcohol from the crude liquor.

In the manufacture of wood-alcohol the crude liquor, which is obtained by the distillation of wood, is neutralized with milk of lime and when in this condition contains a very large per cent. of oils, liquids, and other impurities other than wood-alcohol—viz., ammonia compounds, acetone, allyl alcohol, ethers, and aldehydes. These various products, together with the impurities, are washed out or removed by being distilled, separated, and condensed in my mproved apparatus, leaving a high-grade or nearly pure wood-alcohol.

My invention consists of a suitable boiler, a column of peculiar construction arising from said boiler, a separator, and a condenser, which are connected to the column by suitable pipes.

My invention further consists in certain novel features of construction and arrangement of parts that will be hereinafter set forth, pointed out in the claims, and illustrated in the accompanying drawings, in which—

Figure 1:
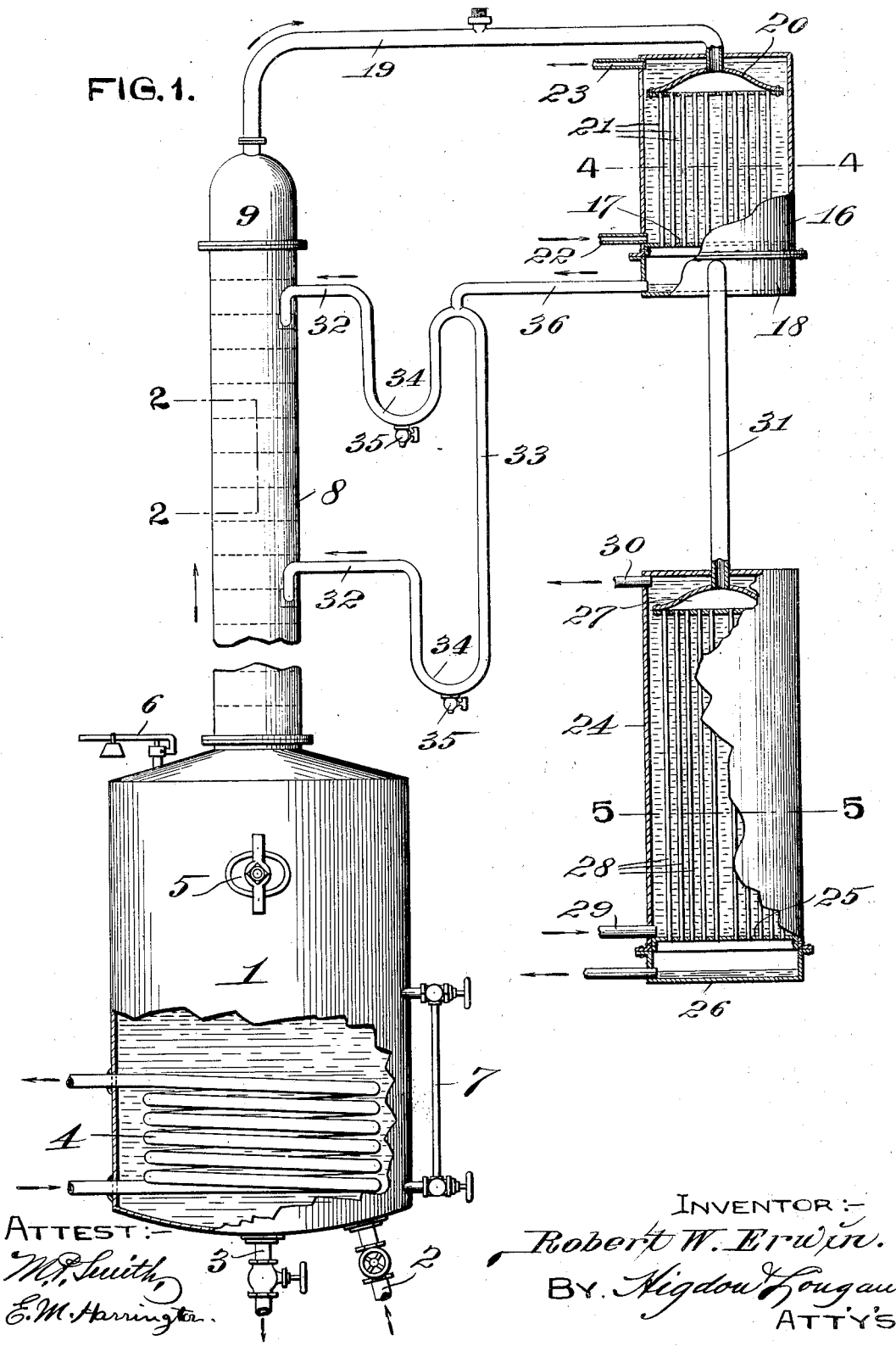
Figure 2:
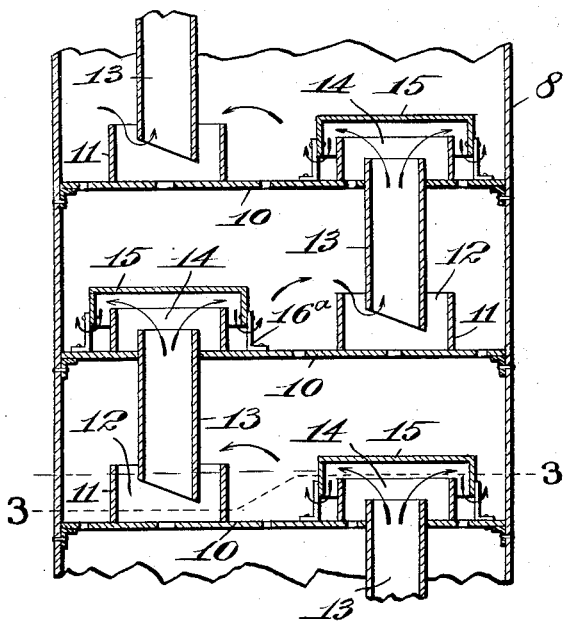
Figure 4:
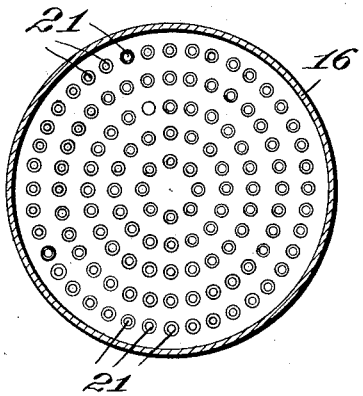
Figure 3:
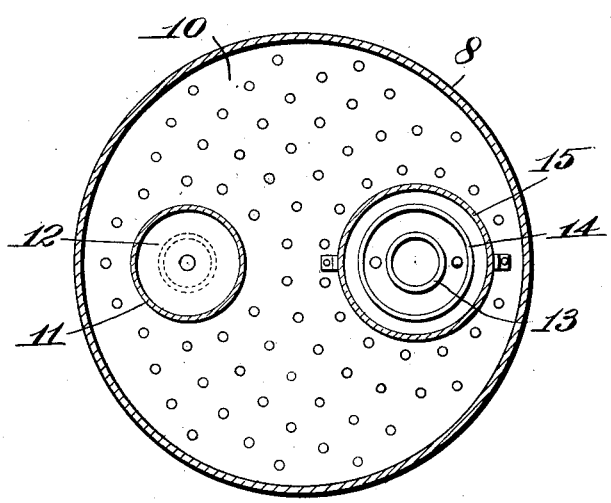
Figure 5:
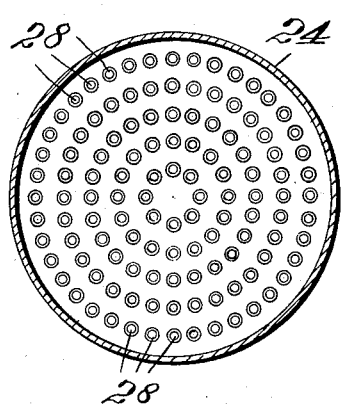

Figure 1 is a side elevation of my complete apparatus, parts thereof being broken away to more clearly illustrate the same. Fig. 2 is an enlarged vertical section taken approximately on the line 2 2 of Fig. 1. Fig. 3 is a horizontal section taken on the line 3 3 of Fig. 2. Fig. 4 is an enlarged horizontal section taken on line 4 4 of Fig. 1. Fig. 5 is an enlarged horizontal section taken on the line 5 5 of Fig. 1.

Referring by numerals to the accompanying drawings, 1 indicates a suitable boiler provided in its lower end with an inlet-pipe 2 and with a centrally-arranged discharge or drain pipe 3. Located in the lower end of the boiler is a steam-coil 4, that is utilized for heating the contents of the boiler.

The boiler is equipped with a manhole 5, safety-valve 6, and a gage-tube 7, these parts being of ordinary well-known construction.

Leading upwardly from the center of the boiler 1 a suitable distance is a cylindrical column 8, the upper end of which is closed by a suitable cap 9. Arranged within the column 8 at suitable distances apart are perforated plates or partitions 10. Located on top of each partition and to one side of the center thereof is a ring or circular wall 11, preferably formed of sheet metal and having an open top. Thus when said ring or wall is seated upon the partition 10 a circular chamber 12 is formed within said wall, which chamber is open-topped. A tube 13, somewhat smaller in diameter than is the circular wall 12, has its lower end arranged within the circular chamber 12, and the upper end of said tube is fixed in and passes through the partition 10, that is immediately above the partition on which the circular wall 11 is located. The upper end of this tube 11 terminates a short distance above the partition 10, that supports it, and said upper end is surrounded by a circular wall 14, which is very similar to the circular wall 11. This circular wall forms an open-topped circular chamber around the upper end of the tube 13, and positioned above the circular wall is a cap 15 in the form of an inverted pan having a vertical side wall, this pan being supported by suitable metallic feet 16ª, that rest upon and are secured to the horizontal partition 10. This arrangement is continued throughout the entire height of column 8, and thus it will be seen that a very tortuous passage is provided for the vapor that rises through the column.

Located a short distance away from the cap 9 that closes the upper end of the column 8 is a vertically-arranged separator-cylinder 16 of suitable size and height, in the lower end of which cylinder is located a horizontally-arranged partition 17, and secured to said cylinder below this partition is a pan 18.

A vapor-conducting pipe 19 of suitable size leads from the cap 9 on the upper end of the column 8 to and through the closed upper end of the cylinder 16. The end of this pipe 19 within the cylinder 16 communicates with the interior of a hollow head 20, the same being preferably circular in plan view and the diameter of which is slightly less than the internal diameter of the cylinder 16.

A series of small vertical tubes 21 have their lower ends seated in the partition 17, and their upper ends are seated in and pass through the bottom of the hollow head 20, thus establishing communication from the interior of said head 20 with the interior of the pan 18.

A water-inlet pipe 22 leads to the interior of the cylinder 16 just above the partition 17, and a water-outlet pipe 23 leads from the cylinder 16 at a point near the upper end thereof.

Located a suitable distance below the separator-chamber just described is a hollow cylinder or tank 24, that forms the condenser of my improved apparatus. This tank is provided in its lower end with a horizontally-arranged partition 25, and immediately below this partition and connected to the lower end of the cylinder is a pan 26. Located in the upper end of this condenser is a hollow head 27, similar to the hollow head 20, previously described, and connecting this hollow head with the pan 26 is a series of vertically-arranged pipes 28.

A water-inlet pipe 29 leads into the condenser just above the partition 25 therein, and a water-outlet pipe 30 leads from the upper end of the condenser above the hollow head 27.

Leading from the upper end of the pan 18 below the separator-cylinder is a vapor-pipe 31, that passes through the top of the condenser 24 and discharges into the hollow head 27.

Leading into the column 8 at suitable points near the upper end thereof are horizontally-arranged ends 32 of a vertically-arranged pipe 33, and between the main body portion of this vertical pipe and its horizontally-arranged ends are formed U-shaped bends 34, which form traps in said pipes, and said traps are provided with drain-cocks 35.

Leading from the lower end of the pan 18 to the upper end of the vertically-arranged pipe 33 is a horizontally-arranged pipe 36.

The operation of my improved apparatus is as follows: The crude liquor which is to be distilled in my improved apparatus after being neutralized with milk of lime is delivered into the boiler 1 through the inlet-pipe 2. Steam is now turned on in the coil 4, and as a result the crude liquor within the boiler will become so heated as that it turns to vapor, and this vapor, which is, as stated, very heavily impregnated with products other than wood-alcohol, will rise through the column 8, and in so doing it necessarily passes upwardly through the pipes 13, thence over the tops of the walls 14, beneath the lower edges of the caps 15, thence over the tops of the walls 11, and thence upwardly through the next pipes 13. Thus the vapor follows a very tortuous passage in passing upwardly through the column 8 (see arrows, Fig. 2) and the impurities in said vapor being the first to condense will be deposited onto the partitions 10 and will readily pass downwardly through the apertures $10^a$ in the form of drops, and this constant dripping passing through the rising vapor will tend to increase the condensation of the impurities. The vapor after passing through the cap 9 and pipe 19 is delivered to the hollow head 20 and the tubes 21. A circulation of water is established around these tubes by a constant discharge of water through the inlet-pipe 22 and the consequent discharge of water through the outlet-pipe 23. The vapor in passing downwardly through the pipes 21 is freed and separated from its impurities, which latter discharge through the lower ends of the pipes 21 into the pan 18. From this point the impurities pass off through the pipe 36 into the pipe 33, through the traps 34 therein, and finally discharge through the horizontal ends 32 into the column 8 and finally down through said column back to the boiler 1. The wood-alcohol vapor, now freed of the impurities, passes from the pan 18 through the pipe 31 into the hollow head 27. A circulation of water is maintained within the condenser 24 by the constant discharge of water through the pipe 29, which water finds an outlet through the pipe 30, and this water circulating between the pipes 28 will cause the wood-alcohol vapor passing downwardly through said pipes to condense into liquid form, and in this form it finally discharges into the pan 26, from whence it may be drawn off as desired.

Thus it will be seen that I have constructed an apparatus for the condensation or distillation of wood-alcohol, which apparatus is simple, inexpensive, easily set up, and readily operated, it requiring very little attention after once being started.

I claim—

1. In an apparatus of the class described, a boiler, a tubular column rising therefrom, perforated partitions horizontally arranged in said column, a vapor-conveying tube vertically arranged through each partition, a circular wall fixed on each partition and surrounding the lower end of each tube, the top of which wall is in a plane above that occupied by the lower end of the tube, a circular wall fixed on each partition around the upper end of each tube, the upper end of which wall is in a plane above that occupied by the upper end of the tube, and an open-bottomed cap arranged over the upper end of the tube and the circular wall surrounding the same, the lower end of which cap is in a plane below that occupied by the upper end of the wall which said cap incloses; substantially as specified 2. In an apparatus of the class described, a boiler, a wash-column leading upwardly therefrom, a cylindrical separator-tank, a horizontally-arranged partition in the lower end of said tank, tubular connections from the compartment below said partition to different points in the wash-column, a tubular connection leading from the upper end of the wash-column through the upper end of the separator-tank, a hollow head located within the upper end of the separator-tank into which the last-mentioned tubular connection discharges, a series of vertically-arranged tubes leading from the hollow head to the compartment beneath the horizontal partition in the separator, a cylindrical condenser-tank, a horizontally-arranged partition in the lower end thereof, a hollow head arranged in the upper end of the condenser-tank, a tubular connection from the compartment in the lower end of the separator-tank to the hollow head in the condenser-tank, and a series of tubes leading from the hollow head in the condenser-tank downwardly to the compartment beneath the horizontally-arranged partition in the lower end of said condenser-tank; substantially as specified.

In testimony whereof I have signed my name to this specification in presence of two subscribing witnesses.

ROBERT W. ERWIN.

Witnesses:
M. P. SMITH,
E. M. HARRINGTON.